United States Patent [19]

Cok

[11] Patent Number: 4,605,956

[45] Date of Patent: Aug. 12, 1986

[54] SINGLE-CHIP ELECTRONIC COLOR CAMERA WITH COLOR-DEPENDENT BIREFRINGENT OPTICAL SPATIAL FREQUENCY FILTER AND RED AND BLUE SIGNAL INTERPOLATING CIRCUIT

[75] Inventor: David R. Cok, Rochester, N.Y.

[73] Assignee: Eastman Kodak Company, Rochester, N.Y.

[21] Appl. No.: 649,000

[22] Filed: Sep. 10, 1984

[51] Int. Cl.[4] .................... H04N 9/077; H04N 9/07
[52] U.S. Cl. .............................. 358/44; 358/55
[58] Field of Search .............. 358/43, 44, 41, 48, 358/55

[56] References Cited

U.S. PATENT DOCUMENTS

| | | | |
|---|---|---|---|
| 3,588,224 | 6/1971 | Pritchard | 350/157 |
| 3,696,202 | 10/1972 | Mori et al. | 358/43 |
| 4,176,373 | 11/1979 | Dillon et al. | 358/37 |

FOREIGN PATENT DOCUMENTS 0094676 11/1983 European Pat. Off. .

Primary Examiner—James J. Groody
Assistant Examiner—Randall S. Svihla
Attorney, Agent, or Firm—Thomas H. Close

[57] ABSTRACT

An electronic color camera having a single-chip solid state color image sensor, includes a color dependent birefringent spatial filter that deflects red and blue light from portions of an image sampled by the neighboring green sensitive image sensing elements onto red and blue sensitive image sensing elements. Signal processing electronics produces interpolated red and blue signal values by forming red and blue hue component values at the red and blue sampling locations, interpolating the hue component values, and producing the interpolated red and blue values as a function of the interpolated hue component values, and green signal values at the interpolation locations. As a result, color fringes at monochrome edges are completely eliminated, and are substantially reduced at colored edges.

7 Claims, 19 Drawing Figures

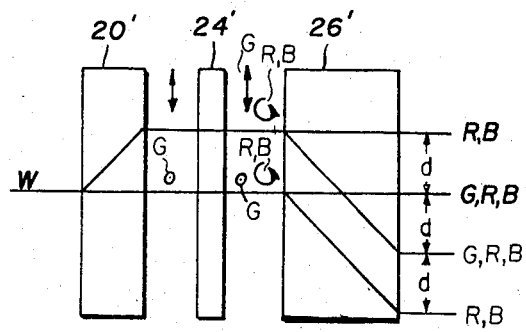

SINGLE-CHIP ELECTRONIC COLOR CAMERA WITH COLOR-DEPENDENT BIREFRINGENT OPTICAL SPATIAL FREQUENCY FILTER AND RED AND BLUE SIGNAL INTERPOLATING CIRCUIT

TECHNICAL FIELD

The present invention relates to an electronic color camera of the type having a single-chip solid state color image sensor.

BACKGROUND ART

Electronic color cameras are known in which a single-chip image sensor is provided with an array of color filter elements to render the image sensor color-responsive. Such electronic color cameras employing single-chip solid-state color image sensors have the problem of producing colored fringes around high frequency image detail. This problem results because the different colors of the image are sampled at different parts of the image. When an image is reconstructed from the sampled image signals produced by the image sensor, generally some form of interpolation is employed for supplying interpolated values between the sampled color values. The interpolation of each color of the image is slightly different due to the different sampling locations, thus resulting in the colored fringes.

To illustrate the phenomenon, Table I is provided to represent the relative intensities of red, green and blue colors in one horizontal line across a vertical neutral colored edge.

TABLE I

| Original Scene - Relative Intensities | | | | | | | | |
|---|---|---|---|---|---|---|---|---|
| Red | 10 | 10 | 10 | 10 | 2 | 2 | 2 | 2 | 2 |
| Green | 10 | 10 | 10 | 10 | 2 | 2 | 2 | 2 | 2 |
| Blue | 10 | 10 | 10 | 10 | 2 | 2 | 2 | 2 | 2 |

Table II shows the relative intensities sampled by an image sensor having a repeating pattern of red, green, blue, green sensing elements.

TABLE II

| Sampled Values | | | | | | | | |
|---|---|---|---|---|---|---|---|---|
| Red | 10 | — | — | — | 2 | — | — | — | 2 |
| Green | — | 10 | — | 10 | — | 2 | — | 2 | — |
| Blue | — | — | 10 | — | — | — | 2 | — | — |

Table III shows the relative intensity values produced by linear interpolation between the sampled values in Table II.

TABLE III

| Linear Interpolation Between Sampled Values | | | | | | | | |
|---|---|---|---|---|---|---|---|---|
| Red | 10 | 8 | 6 | 4 | 2 | 2 | 2 | 2 | 2 |
| Green | 10 | 10 | 10 | 10 | 6 | 2 | 2 | 2 | 2 |
| Blue | 10 | 10 | 10 | 8 | 6 | 4 | 2 | 2 | 2 |

As can been seen in Table III, the reproduced neutral edge is rendered in a variety of colors, ranging from a cyan color (green+blue) on the left to a blue color on the right.

One technique for reducing the appearance of these colored fringes employs signal processing on the sampled colored signals. For example, U.S. Pat. No. 4,176,373 issued to P. L. P. Dillon et al. on Nov. 27, 1979, shows a signal processing technique where a high frequency portion of a luminance signal is added to the color signals in an attempt to drive the image signal towards neutral at image details, thereby reducing the appearance of colored fringes.

Another technique for reducing the appearance of colored fringes employs an optical spatial frequency filter made from sheets of birefringent material. The optical spatial frequency filter splits an image into two or more slightly displaced images. The filter has the effect of blurring the input image. This technique is described in a published European Patent Application Publication No. 0-094-676 filed May 17, 1983, by Hitachi, Limited. Although both techniques are effective for reducing the appearance of colored fringes, neither technique alone or in combination completely eliminates the appearance of color fringes in the images reproduced from the sampled color image signals.

DISCLOSURE OF THE INVENTION

It is the object of the present invention to provide an electronic color camera of the type noted above that produces a signal having reduced color fringing in the areas of image detail. The object is achieved according to the invention by (1) providing the camera with a solid-state color image sensor of the type having red, green and blue image sensing elements, the red and blue image sensing elements being located between neighboring green image sensing elements; (2) providing a birefringent optical spatial frequency filter that is color dependent such that red and blue light from portions of the image sampled by the neighboring green image sensing elements is deflected onto the respective red or blue image sensing element located between them, and (3) performing an interpolation between red or blue sampled values by forming a red or blue hue value at the respective sampling locations, interpolating the hue values, and forming the interpolated red or blue values as a function of the green signal value at the sample location and the interpolated red or blue hue signal value.

BRIEF DESCRIPTION OF THE DRAWINGS

Modes of carrying out the invention will be described with reference to the drawings, wherein:

FIG. 6 shows a checkerboard color filter pattern useful with the present invention;

FIG. 7 shows a checkerboard color filter pattern having 75 percent green filter elements useful with the present invention;

FIG. 8 shows an alternative configuration of a color dependent optical spatial frequency filter useful with the present invention;

FIGS. 9a–9d show the effective color sampling pattern produced by the color dependent optical spatial frequency filter shown in FIG. 2a in combination with the color filter pattern shown in FIG. 1b; and FIGS. 10a–10d show the effective color sampling pattern produced by the color dependent optical spatial frequency filter shown in FIG. 8 in combination with the color filter pattern shown in FIG. 1b.

MODES OF CARRYING OUT THE INVENTION

Figure 1A:
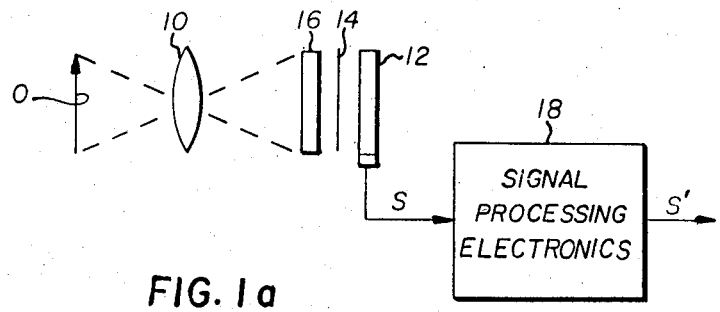
FIG. 1a is a schematic block diagram showing an electronic camera having a single-chip color image sensor, an optical spatial frequency filter, and signal processing electronics.

An electronic color camera is shown in FIG. 1a. The camera includes a lens 10 for forming an image of an object O on a single-chip solid-state color image sensor 12. The solid state color image sensor, such as a CCD image sensor, comprises a rectangular array of image sensing elements. The image sensor 12 is made color sensitive by means of a color filter array 14 on the front surface of the image sensor. A birefringent optical spatial frequency filter 16 filters the image received by the image sensor. A sampled color image signal S, produced by the image sensor 12, is processed by signal processing electronics 18, for example to interpolate values between sampled values, to produce a processed color image signal S'.

Figure 1B:
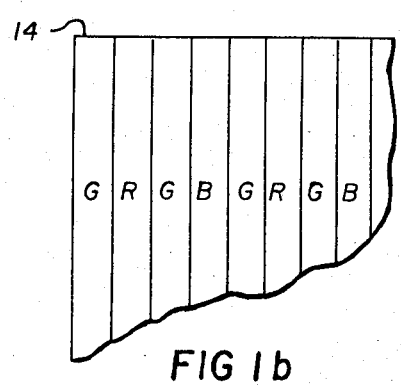
FIG. 1b shows a color filter pattern for the single-chip color image sensor.

The single-chip color image sensor includes red, green and blue sensitive image sensing elements in a pattern having the property that red and blue sensitive image sensing elements are located between neighboring green sensitive image sensing elements. FIG. 1b shows one type of known color filter array 14 for producing this required sensitivity pattern on the image sensor. The vertical stripes labeled G, R, G, B, represent green, red, green and blue color filter elements respectively. The color filter elements are aligned over vertical columns of image sensing elements on the image sensor.

Figure 2A:
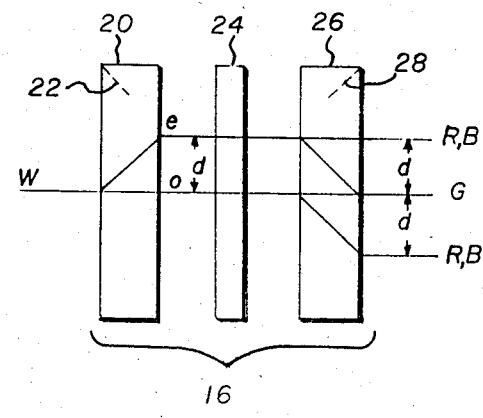
FIGS. 2a-2c are schematic diagrams illustrating the color dependent optical spatial frequency filter forming part of the present invention.

The birefringent optical spatial frequency filter 16 is color dependent. It displaces the red and blue light from the neighboring green sampling locations onto the red or blue sensitive image sensing element located between them. The basic concept of a color dependent optical spatial frequency filter is disclosed in copending Patent Application No. 597,290, filed on April 6, 1984. As shown in FIG. 2a, the birefringent optical spatial frequency filter 16 includes three elements of birefringent material 20, 24 and 26. The first element 20 has an optic axis 22 oriented such that a ray of unpolarized white light W is split into an ordinary ray o passing straight through the element and an extraordinary e that is displaced in the element by a distance d and emerges from the element parallel to the ordinary ray. The second element 24 changes the polarization state of light passing through it, but does not deflect the rays. The third element 26 is similar to the first element 20 but its optical axis 28 is oriented to displace the extraordinary ray in the opposite directon.

The amount of displacement of the extraordinary ray depends on the indices of refraction of the birefringent material, the angle the optic axis makes with the normal to the surface of the material, and the thickness of the element. These parameters are chosen so that the displacement d between the rays emerging from the birefringent optical spatial frequency filter 16 is equal to the distance between the columns of image sensing elements in the image sensor 12.

Figure 2B:
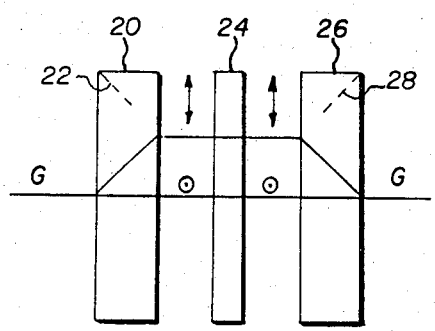

As shown in FIG. 2a, a ray of white light W entering the optical spatial frequency filter 16 exits as three rays of colored light. The outside rays are colored magenta (R+B) and the center ray is colored green. The key to achieving this color dependent behavior is to properly tailor the thickness of the second element 24 so that the polarization states of light of different colors are changed by different amounts. As shown in FIG. 2b, the green light entering the first element 20 is split into an ordinary ray polarized perpendicular to the plane of the drawing as shown by the bull's eye, and an extraordinary ray polarized in the plane of the drawing as indicated by the double-headed arrow. The second element 24 changes the polarization state of the green light by an integral multiple of $\pi$ radians, returning the polarization states of green light rays to their original conditions. The third element 26 deflects the ray polarized in the plane of the drawing back to its original trajectory, and does not deflect the ray that is polarized perpendicular to the plane of the drawing. As a result, the green light ray emerges from the filter unaffected.

Figure 2C:
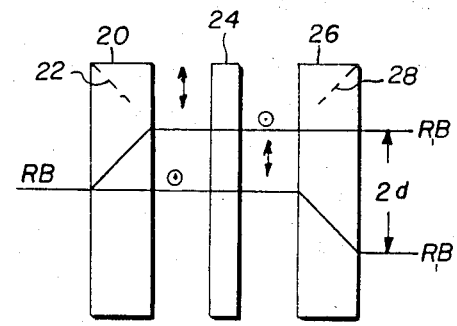

FIG. 2c shows how the red and blue light rays are affected by the color dependent birefringent optical spatial frequency filter 16. In the first element 20, the red and blue light rays are split into ordinary and extraordinary rays as was described above. In the second element 24, the polarization states of the ordinary and extraordinary rays are changed by an odd multiple of $\pi/2$ radians. As a result, the polarization states of the ordinary and extraordinary rays are reversed as indicated by the bull's eyes and arrows in FIG. 2c. On passing through the third element 26, the ray polarized perpendicular to the plane of the drawing is unaffected, and the ray polarized in the plane of the drawing is deflected away from the undeflected ray. As a result, the red and blue rays emerge from the color dependent optical spatial frequency filter separated by a total distance 2d. The effect shown in FIG. 2a results from a superposition of the effect shown in FIGS. 2b and 2c.

The polarization state change effected by the second element 24 can be achieved, for example, by using an optically active material, or by using a birefringent material with an optic axis perpendicular to the normal to the surface and oriented at 45° to the plane containing the normal and the optic axis of the first element 20.

For example, if the second element 24 is an optically active material which rotates the plane of polarization of incident light, commonly called a polarization rotator, the thickness of the element can be chosen such that green light is rotated by a multiple of $\pi$ radians and red and blue light is rotated by $\pi/2$ radians greater or less than the rotation of the green light. This effect is possible because the angle of rotation $\beta$ is strongly dependent on wavelength according to the formula:

$$\beta = \frac{\pi DL}{\lambda} \quad (1)$$

where:
  D is the difference between indices of refraction for right and left circularly polarized light,
  L is the thickness of the material, and
  $\lambda$ is the vacuum wavelength of the light in the material.

Specifying a rotation of $m\pi$ at a wavelength of $\lambda_o$ gives a thickness of $L = m\lambda_o/D$, and a rotation angle of $\beta = \pi m \lambda_o/\lambda$ for any other wavelength $\lambda$.

For a green wavelength of 550 nm and for a thickness L sufficient to rotate the polarization of green light through $2\pi$ radians, (m=2) the red wavelength for which $\beta=(m-\frac{1}{2})\pi$ is 733 nm and the blue wavelength for which $\beta=(m+\frac{1}{2})\pi$ is 440 nm.

For m=3, the corresponding wavelengths are 660, 550, and 471 nm. For m=4, they are 629, 550 and 489 nm. Depending upon which of these thicknesses is chosen, the spectral transmission properties in the color filter array 14 are tailored to match these respective wavelengths.

The other way of making a color dependent polarization state change in the light rays between the first and third birefringent elements 20 and 26 is to employ a piece of birefringent material having its optical axis perpendicular to its surface normal and oriented at 45° to the plane which contains the surface normal and the optic axis 22 of the first element 20. Such an element is commonly called a waveplate. In this orientation, the birefringent material causes a phase difference to accumulate between the ordinary and extraordinary rays passing through the material. It is this accumulated phase difference that is employed to change the polarization state of the light rays in the material. The accumulated phase difference $\phi$ will be:

$$\phi = 2\pi \, DL/\lambda \quad (2)$$

where:
D is the difference between the indices of refraction in the birefringent material,
L is the thickness of the material, and
$\lambda$ is the vacuum wavelength of the light.

When the thickness L is such that the accumulated cumulated phase difference $\phi=\pi$ radians, the sheet of material is called a half wave plate, and it has the effect of rotating the polarization state of light by 90°. When the phase difference $\phi=2\pi$ radians, it is called a full wave plate, which has no effect on the polarization state of light passing through it. What is needed for the purpose of the color dependent optical spatial frequency filter is a thickness of material such that it is a full wave plate for green light and an odd multiple of a one-half wave plate for red and blue light. Thus for a reference wavelength $\lambda_o$, $\phi$ for other wavelengths $\lambda$ will be:

$$\phi = 2\pi m \, \lambda_o/\lambda \quad (3)$$

This equation results in the same sets of wavelengths for red, green and blue for second, third and fourth order full wave plates in green.

Figure 3:
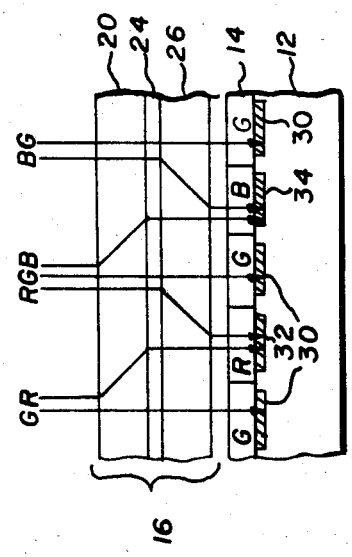
FIG. 3 is a diagram illustrating the operation of the color dependent optical spatial frequency filter with the single-chip color image sensor.

FIG. 3 illustrates the effect of the color dependent optical spatial frequency filter 16 on the image forming light falling on the image sensor 12. Green light, represented by the arrows labeled G, passes directly through the optical spatial frequency filter 16 and through the green colored filter elements in the color filter array 14, labeled G in FIG. 3, to fall on the green image sensing elements 30 in the image sensor 12. Red light, represented by the arrows labeled R is deflected from the areas of the neighboring green sensitive elements through the red filter elements onto the red sensitive element 32. Similarly, blue light represented by the arrows labeled B is deflected from the areas of the neighboring green sensitive elements through the blue filter onto the blue sensitive image sensing element 34.

Table IV shows the relative intensities sampled by the single-chip color image sensor in combination with the color dependent spatial frequency filter 16 when sensing the vertical neutral edge described previously.

TABLE IV

| Sampled Values With Color Dependent Optical Spatial Filter | | | | | | | | |
|---|---|---|---|---|---|---|---|---|
| Red   | 10 | —  | —  | —  | 6 | — | — | 2 |
| Green | —  | 10 | —  | 10 | — | 2 | — | 2 | — |
| Blue  | —  | —  | 10 | —  | — | — | 2 | — | — |

Figure 4:
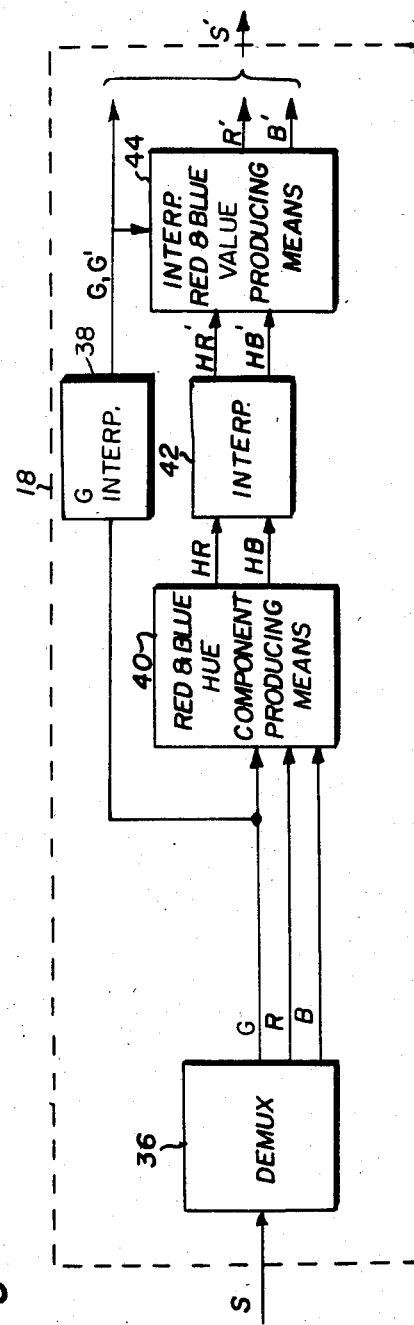
FIG. 4 is a schematic block diagram illustrating the signal processing electronics forming a part of the present invention.

The signal processing performed by the signal processing electronics 18 will now be described with reference to FIGS. 4 and 5.

Figure 5:
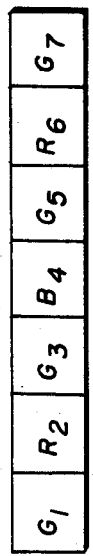
FIG. 5 is a diagram useful in describing the signal processing function performed by the signal processing electronics.

FIG. 5 shows a portion of a line of image sensing elements labeled with letters G, R, B, etc. to indicate color sensitivity and subscripts 1-7 to indicate relative position in the array. The purpose of the signal processing electronics 18 is to provide interpolated signal values between samples, for example, to provide red signal values at positions 3, 4 and 5.

The signal processing apparatus 18 includes a demultiplexer 36 for separating the red, green and blue signal values R, G and B from the sampled color image signal S produced by the image sensor 12, a linear interpolation means 38 for producing interpolated green signal values G' between sampled green values, hue component producing means 40 for producing red and blue hue component values at the red and blue sample locations, interpolation means 42 for producing interpolated red and blue hue component values between the red and blue sample locations, and means 44 for producing interpolated red and blue values from the interpolated red and blue hue component values and the green values. The signal processing electronics 18 produces interpolated green, red and blue signal values G', R' and B' respectively which comprise the processed signal S'.

Interpolated green values are produced by an interpolation means 38 that is appropriate to the color filter pattern. For the stripe pattern of FIG. 5, this is a linear interpolation as follows:

$$G'_2 = \frac{G_1 + G_3}{2} \quad (1)$$

where the primes indicate that the green value is an interpolated value.

The hue component producing means 40 produces red hue component values HR as follows:

$$HR_2 = \frac{R_2}{\frac{1}{2}(G_1 + G_3)} \quad HR_6 = \frac{R_6}{\frac{1}{2}(G_5 + G_7)} \quad (2)$$

and similarly for the blue hue component values HB.

The hue component values are interpolated by interpolation means 42 to provide interpolated red hue component values HR' as follows:

$$HR'_3 = \left( 3 \frac{R_2}{\frac{1}{2}(G_1 + G_3)} + \frac{R_6}{\frac{1}{2}(G_5 + G_7)} \right) / 4 \quad (3)$$

$$HR'_4 = \left( \frac{R_2}{\frac{1}{2}(G_1 + G_3)} + \frac{R_6}{\frac{1}{2}(G_5 + G_7)} \right) / 2 \text{ etc.}$$

and similarly for the blue hue component values HB'.

The interpolated hue component values and the interpolated green values are employed by means 44 to produce the interpolated red and blue values as follows:

$$R'_2 = G'_2 \cdot HR_2 \quad (4)$$

$$R'_3 = G'_3 \cdot HR'_3$$

$$R'_4 = G'_4 \cdot HR'_4 \text{ etc.}$$

and similarly for the interpolated blue values. The signal processing technique is the subject of copending patent application No. 825,008, filed on Feb. 3, 1986, which is a continuation of U.S. patent application Ser. No. 648,999, filed on Sept. 10, 1984, and of U.S. patent application Ser. No. 676,910, filed on Nov. 30, 1984, which in turn is a continuation of U.S. patent application Ser. No. 648,998, filed on Sept. 10, 1984, now abandoned.

Preferably the signal processing electronics 18 is implemented by a digital computer programmed to solve the equations described above. Although the signal processing electronics is shown physically connected to the image sensor 12, the invention may be practiced by recording the signal S from the image sensor 12 for later processing by signal processing electronics that is physically separated from the image sensor 12.

Table V shows the relative intensity values reconstructed by the signal processing electronics 18 from the sampled values measured by the single-chip color image sensor having the color dependent optical spatial frequency filter.

TABLE V

| Hue Component Interpolation With Filtered Samples | | | | | | | | |
|---|---|---|---|---|---|---|---|---|
| Red | 10 | 10 | 10 | 10 | 6 | 2 | 2 | 2 | 2 |
| Green | 10 | 10 | 10 | 10 | 6 | 2 | 2 | 2 | 2 |
| Blue | 10 | 10 | 10 | 10 | 6 | 2 | 2 | 2 | 2 |
| HR | 1 | 1 | 1 | 1 | 1 | 1 | 1 | 1 | 1 |
| HB | 1 | 1 | 1 | 1 | 1 | 1 | 1 | 1 | 1 |

As can be seen from the values in Table V, no color fringing has been introduced into the reconstructed image. Although the color camera according to the present invention produces some color fringing when there is a color change across an edge, the amount of color fringing is less than that produced by the prior art.

FIG. 6 shows an alternative color filter array pattern useful with the present invention. The pattern shown in FIG. 6 comprises a checkerboard array wherein every other image sensing location in two orthogonal directions is green sensitive. Identical signal processing to that described with reference to the vertical striped pattern shown in FIG. 1b may be applied line-by-line to the signal produced using the checkerboard pattern shown in FIG. 6. Alternatively, two-dimensional signal processing may be employed to interpolate the sample values both horizontally and vertically to improve the interpolation accuracy. For an example of two dimensional signal processing employing pattern recognition, see patent application Ser. No. 649,001, filed on Sept. 10, 1984. FIG. 7 shows a further filter array pattern useful with the present invention. The array pattern shown in FIG. 7 contains 75% green samples. Again, the signal processing applied to the signal produced by the vertical striped pattern shown in FIG. 1b can be applied to every other line produced by the image sensor having a color filter as shown in FIG. 7. Alternatively, two-dimensional signal processing can be employed to further improve the accuracy of interpolation.

FIG. 8 shows an alternative configuration for the color dependent optical spatial frequency filter 16'. In FIG. 8, elements similar to elements in FIG. 2 are numbered with primes. In this embodiment, the thickness of the second element 24' is chosen such that the polarization state of the green light remains unchanged, and the red and blue light is changed from linear polarized light to circularly polarized light. This effect is achieved if the element 24' is a first order full wave plate in green. Element 26' is twice as thick as element 20' to cause the separation between the two central rays to be equal to the distance between columns of image sensing elements in the image sensor. FIG. 10 shows the effective sensor sizes and relative locations of red, green and blue sensors when the color dependent spatial frequency filter shown in FIG. 8 is employed with a color sampling pattern like that shown in line a of FIG. 10. As can be seen in FIG. 10, the effective size of the green sensitive image sensing elements are effectively doubled and the effective size of the red and blue image sensing elements are quadrupled. The light from the neighboring green sensitive elements is deflected onto the red or blue sensitive element located in between. The effective sampling pattern shown in FIG. 10 can be compared with the effective sampling pattern shown in FIG. 9 which represents that produced by employing the color dependent spatial frequency filter shown in FIG. 2a. As can be seen by the comparison, both sampling patterns cause the red or blue light falling on the green sensitive image sensing elements to be deflected onto the red or blue image sensing elements located between them. With the color dependent optical spatial frequency filter shown in FIG. 8, the effective size of the image sensing elements is increased, thereby providing additional optical spatial frequency filtering.

Advantages and Industrial Applicability

By causing light from adjacent green sensitive image sensing elements to fall on the red or blue image sensing elements located between them, and interpolating the red and blue sample values as a function of the measured hue component values, color fringes in neutral or monochrome edges are completely eliminated, and color fringes in colored edges are substantially reduced. The color dependent spatial frequency filter has the effect of causing the image sensor to sample the red and blue colors at the same locations as the green image sensing elements. This insures that the measured hue components are accurate when the green samples are interpolated in a manner consistent with the image sampling. The invention is useful in video and still electronic cameras for amateur and professional use.

I claim:

1. An electronic color camera having a single-chip solid state color image sensor, a birefringent optical spatial frequency filter element, and signal processing electronics for providing interpolated red and blue signal values between sampled red and blue signal values, characterized by:

(a) the solid state color image sensor having red, green and blue image sensing elements, the red and blue image sensing elements each being located between two neighboring green image sensing elements;

(b) the birefringent optical element being color dependent, deflecting red and blue light from the portions of an image sampled by the neighboring green sensitive image sensing elements onto the red or blue sensitive image sensing elements located between them; and (c) the signal processing electronics including means for producing a signal representing red and blue hue component values at the respective red and blue sampling locations, means for interpolating the red and blue hue component values, and means for producing interpolated red and blue signal values as a function of the interpolated hue component values and green signal values.

2. An electronic color camera comprising:

(a) a solid-state color image sensor having red, green and blue image sensing elements for producing red., green and blue image signals, the red and blue image sensing elements each being located between neighboring pairs of green image sensing elements;

(b) color dependent birefringent optical spatial frequency filter means for deflecting red and blue light from portions of an image sampled by the green image sensing elements onto the red or blue image sensing elements located between them, and for substantially not deflecting the green light; and (c) signal processing means, including means for producing a signal representing red and blue hue component values at respective red and blue sampling locations, means for interpolating the red and blue hue component values, and means for producing interpolated red and blue signal values as a function of the interpolated hue component values and green signal values.

3. The invention claimed in claim 2, wherein said signal processing means includes means for producing interpolated green signal values at the red and blue sampling locations.

4. The invention claimed in claim 3, wherein said means for producing interpolated green signal values includes means for performing linear interpolation on sampled green signal values.

5. The invention claimed in claim 2, wherein said color dependent birefringent optical spatial frequency filter means comprises a birefringent first element for separating a ray of white light into a pair of parallel rays, a second element for changing the polarization state of green light by a first amount, and for changing the polarization state of red and blue light by amounts which are different from the first amount, and a birefringent third element for separating a ray of white light into a pair of parallel rays.

6. The invention claimed in claim 5, wherein said second element is a polarization rotator for rotating the plane of polarization of green light by a multiple of $\pi$ radians, and for rotating the planes of polarization of red and blue light by an odd multiple of $\pi/2$ radians.

7. The invention claimed in claim 5, wherein said second element is a full wave plate for green light and an odd multiple of a one-half wave plate for red and blue light.

* * * * *